United States Patent
Eun

(10) Patent No.: US 9,633,188 B2
(45) Date of Patent: Apr. 25, 2017

(54) DEVICE, INFORMATION PROCESSING SYSTEM, AND CONTROL METHOD THAT PERMIT BOTH AN AUTHENTICATION-TYPE APPLICATION PROGRAM AND A NON-AUTHENTICATION-TYPE PROGRAM TO ACCESS AN AUTHENTICATION DEVICE

(71) Applicant: Jongsook Eun, Tokyo (JP)

(72) Inventor: Jongsook Eun, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 64 days.

(21) Appl. No.: 14/193,815

(22) Filed: Feb. 28, 2014

(65) Prior Publication Data

US 2014/0245414 A1    Aug. 28, 2014

(30) Foreign Application Priority Data

Feb. 28, 2013 (JP) ................................. 2013-040058
Jan. 14, 2014 (JP) ................................. 2014-004449

(51) Int. Cl.
*G06F 21/34* (2013.01)
*G06F 21/35* (2013.01)
(Continued)

(52) U.S. Cl.
CPC .............. *G06F 21/34* (2013.01); *G06F 21/35* (2013.01); *G06F 21/41* (2013.01); *H04L 9/3234* (2013.01); *H04L 63/0853* (2013.01)

(58) Field of Classification Search
CPC ..... G06F 21/34; G06F 21/35; H04L 63/0853; H04L 9/3234
See application file for complete search history.

(56) References Cited

U.S. PATENT DOCUMENTS 6,742,120 B1 * 5/2004 Markakis et al. ............ 713/184
8,196,131 B1 * 6/2012 von Behren ......... G06Q 20/367
705/64
(Continued)

FOREIGN PATENT DOCUMENTS

CN       1821903       8/2006
CN     101207673       6/2008
(Continued)

OTHER PUBLICATIONS

Jin, Jing; Ahn, Gail-Joon; Shehab, Mohamed; Hu, Hongxin; "Towards Trust-aware Access Management for Ad-hoc Collaborations", International Conference on Collaborative Computing: Networking, Applications and Worksharing, Nov. 12-15, 2007, IEEE, 8 pages.*

(Continued)

*Primary Examiner* — Victor Lesniewski
(74) *Attorney, Agent, or Firm* — Oblon, McClelland, Maier & Neustadt, L.L.P.

(57) ABSTRACT

A device, information processing system, and control method that perform authentication to determine whether a user is an authorized user, permit both an authentication-type application program that performs user authentication and a non-authentication-type application program that does not perform user authentication to access an authentication device when an authentication result indicates that the user is an authorized user, and permit each application program to access the authentication device when an authentication result indicates that the user is an authorized user for the each application program.

11 Claims, 11 Drawing Sheets

(51) Int. Cl.
*H04L 29/06* (2006.01)
*H04L 9/32* (2006.01)
*G06F 21/41* (2013.01)

(56) References Cited

U.S. PATENT DOCUMENTS

| | | | | |
|---|---|---|---|---|
| 2001/0030233 A1* | 10/2001 | Asoh | ............... | G06Q 20/341 |
| | | | | 235/382 |
| 2002/0029343 A1* | 3/2002 | Kurita | ............... | G06Q 20/341 |
| | | | | 713/185 |
| 2005/0086479 A1* | 4/2005 | Ondet | ............... | G06F 21/10 |
| | | | | 713/172 |
| 2005/0144446 A1* | 6/2005 | Kishimoto | ............... | G06F 21/41 |
| | | | | 713/168 |
| 2006/0154695 A1* | 7/2006 | Ishibashi | ............... | H04L 63/0869 |
| | | | | 455/558 |
| 2006/0171005 A1 | 8/2006 | Eun | | |
| 2006/0245621 A1* | 11/2006 | Uno | ............... | 382/115 |
| 2007/0206216 A1* | 9/2007 | Sakagami et al. | ............... | 358/1.15 |
| 2007/0220269 A1* | 9/2007 | Suzuki | ............... | 713/182 |
| 2008/0059797 A1* | 3/2008 | Tokuno et al. | ............... | 713/171 |
| 2008/0185433 A1* | 8/2008 | Ando et al. | ............... | 235/439 |
| 2008/0189793 A1* | 8/2008 | Kirkup | ............... | G06F 21/53 |
| | | | | 726/27 |
| 2008/0235434 A1 | 9/2008 | Eun et al. | | |
| 2010/0002250 A1* | 1/2010 | Sakagami et al. | ............... | 358/1.14 |
| 2010/0149574 A1 | 6/2010 | Eun et al. | | |
| 2010/0153643 A1* | 6/2010 | Kobayashi | ............... | H04N 1/00204 |
| | | | | 711/115 |
| 2010/0175128 A1* | 7/2010 | Onozu | ............... | G06F 21/31 |
| | | | | 726/20 |
| 2010/0205449 A1 | 8/2010 | Eun et al. | | |
| 2010/0235900 A1* | 9/2010 | Robinton | ............... | G06F 21/34 |
| | | | | 726/9 |
| 2010/0265532 A1* | 10/2010 | Katahira | ............... | G06F 21/31 |
| | | | | 358/1.14 |
| 2011/0078789 A1* | 3/2011 | Kamasuka | ............... | 726/20 |
| 2011/0093947 A1* | 4/2011 | Kato | ............... | G06F 21/77 |
| | | | | 726/16 |
| 2011/0314304 A1* | 12/2011 | Braams | ............... | G06F 21/79 |
| | | | | 713/193 |
| 2011/0320818 A1* | 12/2011 | Krishna | ............... | G06F 21/34 |
| | | | | 713/175 |
| 2012/0011580 A1 | 1/2012 | Eun et al. | | |
| 2012/0080519 A1* | 4/2012 | Kim | ............... | 235/380 |
| 2012/0096544 A1* | 4/2012 | Hosoda | ............... | 726/19 |
| 2012/0307286 A1* | 12/2012 | Osaki | ............... | 358/1.14 |
| 2013/0321847 A1 | 12/2013 | Eun | | |

FOREIGN PATENT DOCUMENTS

| | | |
|---|---|---|
| JP | 62-280965 | 12/1987 |
| JP | 2003-123032 | 4/2003 |
| JP | 2010-186328 | 8/2010 |
| JP | 2010-218276 | 9/2010 |
| JP | 2010-287051 | 12/2010 |

OTHER PUBLICATIONS

Satoh, Fumiko; Itoh, Takayuki; "Single Sign on Architecture with Dynamic Tokens", International Symposium on Applications and the Internet, Jan. 26-30, 2004, IEEE, 4 pages.*

Chinese Office Action issued Jun. 20, 2016 in Chinese Patent Application No. 201410067016.4 with translation.

* cited by examiner

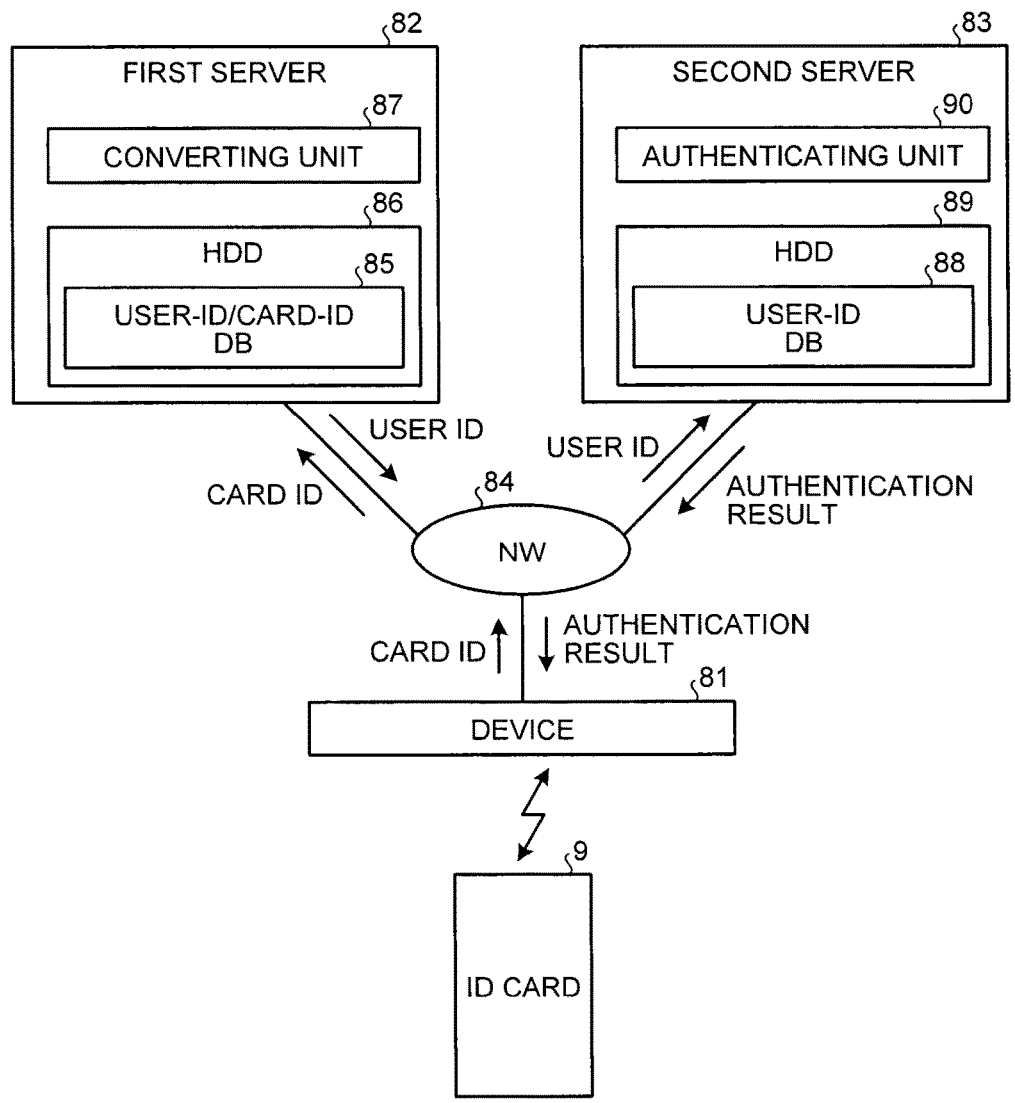

DEVICE, INFORMATION PROCESSING SYSTEM, AND CONTROL METHOD THAT PERMIT BOTH AN AUTHENTICATION-TYPE APPLICATION PROGRAM AND A NON-AUTHENTICATION-TYPE PROGRAM TO ACCESS AN AUTHENTICATION DEVICE

CROSS-REFERENCE TO RELATED APPLICATIONS

The present application claims priority to and incorporates by reference the entire contents of Japanese Patent Application No. 2013-040058 filed in Japan on Feb. 28, 2013 and Japanese Patent Application No. 2014-004449 filed in Japan on Jan. 14, 2014.

BACKGROUND OF THE INVENTION

1. Field of the Invention

The present invention generally relates to a device, an information processing system, and a control method.

2. Description of the Related Art

As is currently known, some type of image forming apparatus provides a plurality of functions such as a facsimile function, a printer function, a copier function, and a scanner function even though the apparatus is housed in a single casing. Such an image forming apparatus may be referred to as a multifunction peripheral (MFP) or a multifunction machine, for example.

Such an image forming apparatus may include a display unit, a printing unit, and an imaging unit in its casing. The image forming apparatus may also have application programs for performing the facsimile function, the printer function, the copier function, and the scanner function. The image forming apparatus may switch from one application program to another when using the application programs. This switching allows the image forming apparatus to function as a facsimile apparatus, a printer apparatus, a copying machine, and a scanner apparatus.

Furthermore, the image forming apparatus may have a login feature. For example, a user may log in to the image forming apparatus using a user name and a password to use the facsimile function and the printer function. The image forming apparatus may be configured to impose restrictions on use of the functions on a per-user basis.

Japanese Laid-open Patent Application No. 2010-186328 discloses an image forming apparatus with an aim of facilitating convenience in using an integrated circuit (IC) card that requires a user to enter a secret number (personal identification number (PIN) when using the IC card. The image forming apparatus disclosed in Japanese Laid-open Patent Application No. 2010-186328 includes a validation unit that validates a user of an IC card. The image forming apparatus also includes a login unit that processes login of the user using the IC card, in which login-related information is stored. The image forming apparatus also includes a storage unit that, when the user of the IC card is validated and thereafter login is successfully processed by the login unit using the IC card, stores identifier information and a secret number of the IC card.

After the login process, the image forming apparatus operates as follows. When the need for entering the secret number arises from use of the/an IC card, the image forming apparatus obtains identifier information from the IC card and compares the identifier information with the identifier information stored in the storage unit. If the identifier information matches, the image forming apparatus validates a user of the IC card by reusing the secret number stored in the storage unit as being associated with the identifier information. Thus, when the need for entering the secret number arises from use of the IC card after the login process, the image forming apparatus can eliminate the need of entering the secret number a second time, thereby facilitating convenience in using the IC card.

An application program (authentication-type application program) that performs user authentication can access information stored in an authentication device such as an IC card if a user is authenticated as an authorized user. By contrast, it will be difficult for an application program (non-authentication-type application program) that does not perform user authentication to authenticate a user as an authorized user without performing user authentication. Furthermore, it is not preferable to permit a non-authentication-type application program to access the information stored in the authentication device without performing user authentication. These reasons make it difficult for a non-authentication-type application program to use information stored in an authentication device.

Under the circumstances, it has conventionally been difficult to securely share information stored in an authentication device between an authentication-type application program and a non-authentication-type application program.

Meanwhile, the image forming apparatus disclosed in Japanese Laid-open Patent Application No. 2010-186328 allows only an authentication-type application program to access information stored in the IC card by reusing the secret number. It is difficult for a non-authentication-type application program to reuse the information stored in the authentication device because the program does not perform user authentication. Accordingly, even when the image forming apparatus disclosed in Japanese Laid-open Patent Application No. 2010-186328 is employed, it is difficult to securely share information stored in an IC card between an authentication-type application program and a non-authentication-type application program.

Therefore, there is a need to provide a device, an information processing system, and a control method that allow securely sharing information stored in an authentication device.

SUMMARY OF THE INVENTION

It is an object of the present invention to at least partially solve the problems in the conventional technology.

According to an embodiment, there is provided a device that includes a first obtaining unit configured to obtain first identification information for use in user authentication from an authentication device; a second obtaining unit configured to obtain second identification information entered by a user; an authenticating unit configured to perform authentication to determine whether the user is an authorized user by comparing the first identification information with the second identification information; and a sharing unit configured to permit both an authentication-type application program that performs user authentication and a non-authentication-type application program that does not perform user authentication to access the authentication device when an authentication result obtained by the authenticating unit indicates that the user is an authorized user.

According to another embodiment, there is provided an information processing system that includes an authenticating unit configured to perform authentication to determine whether a user is an authorized user by using information stored in an authentication device; and a sharing unit configured to permit both an authentication-type application program that performs user authentication and a non-authentication-type application program that does not perform user authentication to access the authentication device when an authentication result obtained by the authenticating unit indicates that the user is an authorized user.

According to still another embodiment, there is provided a control method that includes obtaining, by a first obtaining unit, first identification information for use in user authentication from an authentication device; obtaining, by a second obtaining unit, second identification information entered by a user; performing, by an authenticating unit, authentication to determine whether the user is an authorized user by comparing the first identification information with the second identification information; and permitting, by a sharing unit, both an authentication-type application program that performs user authentication and a non-authentication-type application program that does not perform user authentication to access the authentication device when an authentication result obtained by the authenticating unit indicates that the user is an authorized user.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 12 is a system configuration diagram of an information processing system according to a fifth embodiment.

DETAILED DESCRIPTION OF THE PREFERRED EMBODIMENTS

Exemplary embodiments of the present invention are described in detail below with reference to the accompanying drawings.

First Embodiment

Figure 1:
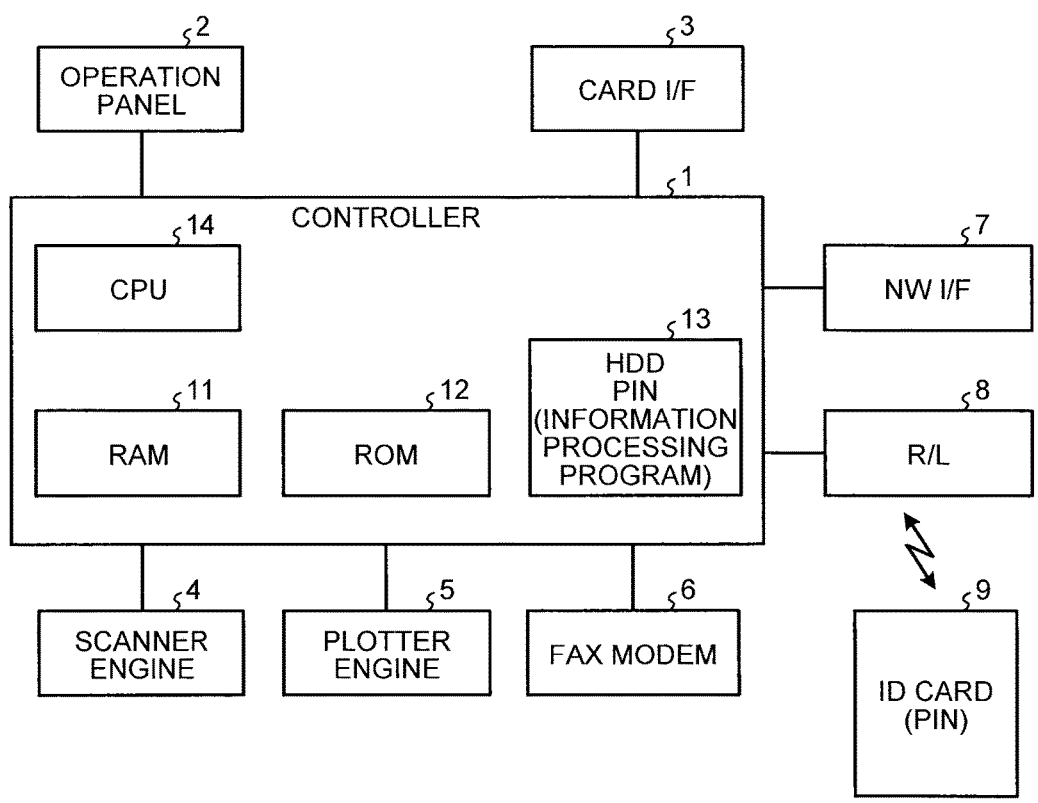
FIG. 1 is a hardware configuration diagram of a device according to a first embodiment.

FIG. 1 is a hardware configuration diagram of a device according to a first embodiment of the present invention. The device illustrated in FIG. 1 can be an image forming apparatus, for example. The device illustrated in FIG. 1 may be a device other than an image forming apparatus. Referring to FIG. 1, the device includes a controller 1, an operation panel 2, a card interface (card I/F) 3, a scanner engine 4, a plotter engine 5, and a modem device (FAX modem) 6 for a facsimile function. The device also includes a network interface (NW I/F) 7, an IDentification (ID) card 9 (an example of an authentication device) (an example of a storage medium card), and a reader/writer unit (R/L) 8 that carries out wireless/contactless communication. These units except the ID card 9 are connected to the controller 1 via, for example, a peripheral component interconnect (PCI) bus line. The ID card 9 is an example of a medium for use in user identification. Accordingly, the ID card 9 may be either what is referred to as an IC card, which has been denoted above, or another medium.

The controller 1 includes a random access memory (RAM) 11 and a read only memory (ROM) 12. The controller 1 also includes a hard disk drive (HDD) 13 (an example of an authentication device) and a central processing unit (CPU) 14. The RAM 11 provides what is referred to as a working area and is used for buffering image data of an image to be printed, for example. The RAM 11 is also used for loading various types of application programs, for example. The RAM 11 is also used as a temporary storage area for data processed by an application program or for other purposes. The ROM 12 stores what is referred to as an operating system (OS) program that is run at startup of the device of the first embodiment and various types of data. The HDD 13 stores various types of application programs and the like, which will be described in detail later.

The CPU 14 operates according to the OS stored in the ROM 12. The CPU 14 loads the application program stored in the HDD 13 into the RAM 11 and executes the program. The device of the first embodiment has a "shared mode", in which card information stored in the ID card 9 is shared between authentication-type application programs (hereinafter, "authentication-type AP") that require user authentication and non-authentication-type application programs (hereinafter, "non-authentication-type AP") that do not require user authentication. The device of the first embodiment also has a "discrete mode", in which user authentication is performed on a per-authentication-application-program basis to grant permission to use the card information stored in the ID card 9. The CPU 14 enters one of the shared mode and the discrete mode selected by, for example, a user and executes processing in the mode.

For example, a user will typically select the shared mode when placing importance on operation efficiency but select the discrete mode when placing importance on security. For this reason, in the device of the first embodiment, the shared mode is set as a default mode, for example. Alternatively, the discrete mode may be set as the default mode.

The operation panel 2 is a display panel having a touch detection feature implemented by placing a touch panel made up of transparent electrodes and the like on a liquid-crystal display panel. A user performs operation by touching a button or the like displayed on the liquid-crystal display panel. The CPU 14 detects a command corresponding to the button or the like displayed at the touch-operated position. The CPU 14 executes processing according to the detected command.

The card I/F 3 includes a mount unit where the ID card 9 is to be mounted and a reader/writer unit that reads/writes card information from/to the mounted ID card 9. The device of the first embodiment further includes the R/L 8 that reads/writes information from/to the ID card 9 by wireless/contactless communication. The device may include any one or both of the card I/F 3 and the R/L 8. A user performs user authentication using any one of the card I/F 3 and the R/L 8 in most instances.

The scanner engine 4 generates image data by optically reading an original document placed on a document scanning table. The plotter engine 5 prints an image by, for example, transferring a toner image electrophotographically formed on a photosensitive element onto recording paper. The FAX modem 6 receives a facsimile image transmitted via a telephone line and transmits a facsimile image via the telephone line.

The NW I/F 7 is an interface for connecting between, for example, a server or a host computer on a predetermined network and the device of the first embodiment. The device of the first embodiment is configured to be capable of obtaining image data of an image to be printed or the like from the host computer or the like connected with the device via the NW I/F 7. The R/L 8 carries out wireless/contactless communication with the ID card 9 of a user. The R/L 8 reads/writes various card information including an identification number (card ID) of the card and a secret number (personal identification number (PIN)) of the user from/to the ID card 9.

Figure 2:
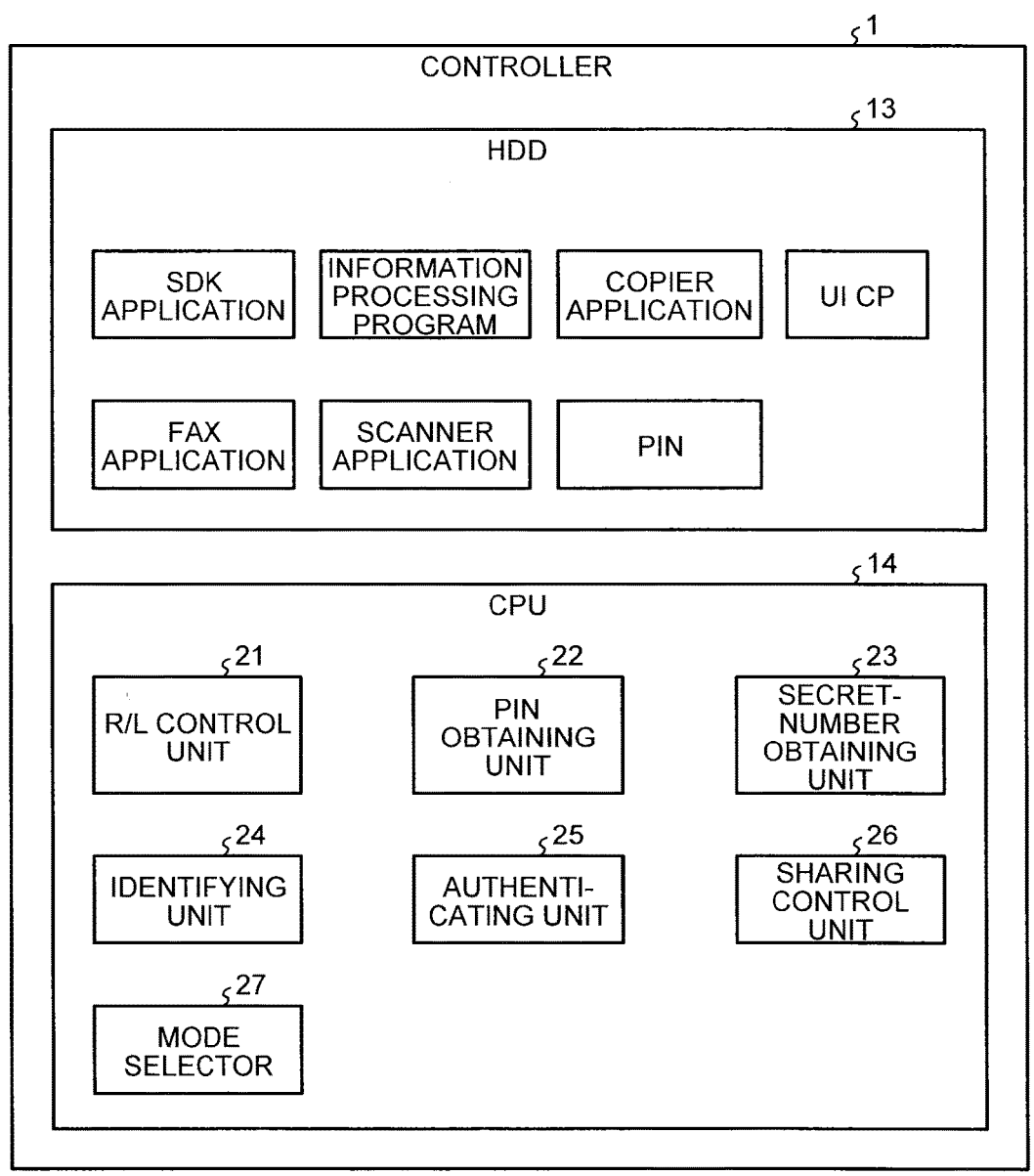
FIG. 2 is a functional block diagram of a controller of the device according to the first embodiment.

FIG. 2 is a diagram illustrating the application programs stored in the HDD 13 of the controller 1 and functions of the CPU 14. As illustrated in FIG. 2, the HDD 13 stores a copier application program (copier AP) for causing the device of the first embodiment to implement a copier function by controlling the scanner engine 4 and the plotter engine 5. The HDD 13 also stores a scanner application program (scanner AP) for causing the device of the first embodiment to implement a scanner function by controlling the scanner engine 4. The HDD 13 also stores a facsimile application program (FAX AP) for causing the device of the first embodiment to implement a facsimile function by controlling the FAX modem 6. Thus, the image forming device of the first embodiment is an MFP (multifunction machine) that, even though being a device in a single casing, provides the plurality of functions including the facsimile function, a printer function, the copier function, and the scanner function by utilizing the various types of application programs.

The HDD 13 stores a user-interface control program (UICP) for controlling display and detection of a touched position on the operation panel 2. The HDD 13 also stores an information processing program for causing the CPU 14 to execute information processing for the shared mode and information processing for the discrete mode, which will be described later.

The information processing program stored in the HDD 13 may be provided as being recorded in a non-transitory tangible computer-readable storage medium, such as a compact disk read only memory (CD-ROM), as a file in an installable format or an executable format so that the program can be executed by the device of the first embodiment.

The information processing program may be provided as being recorded in at least one of a non-transitory tangible computer-readable storage medium, such as a flexible disk (FD), a compact disk recordable (CD-R), a digital versatile disk (DVD), various types of disk recording media, and a semiconductor memory. The information processing program may be configured so as to be downloaded from a server on a network connected to the device via the NW I/F 7 and stored in the HDD 13. The information processing program may be configured so as to be provided or distributed over a network such as the Internet.

The CPU 14 functions as the units illustrated in FIG. 2 by loading and executing the information processing program. More specifically, the CPU 14 loads and executes the information processing program, thereby functioning as an R/L control unit 21, a PIN obtaining unit 22 (may be referred to as a first obtaining unit), a secret-number obtaining unit 23 (may be referred to as a second obtaining unit), and an identifying unit 24. The CPU 14 also functions as an authenticating unit 25 (an example of authenticating unit), a sharing control unit 26 (may be referred to as a sharing unit), and a mode selector 27 (may be referred to as a selecting unit).

The R/L control unit 21 controls the R/L 8 to carry out wireless/contactless communication with the ID card 9. In a case where a secret number (PIN) is stored in the ID card 9, the PIN obtaining unit 22 controls the R/L 8 to read the PIN from the ID card 9. The secret-number obtaining unit 23 controls the operation panel 2 to obtain a secret number entered by a user through a touch operation on the operation panel 2. The identifying unit 24 identifies whether the ID card 9 is an ID card that requires user authentication or an ID card that does not require user authentication.

The authenticating unit 25 compares the secret number obtained by the PIN obtaining unit 22 with the secret number obtained by the secret-number obtaining unit 23 and authenticates the user as an authorized user if the secret numbers match. In the shared mode, the sharing control unit 26 permits both the authentication-type APs and the non-authentication-type APs to access the ID card 9. However, in the discrete mode, the sharing control unit 26 permits only the authentication-type APs to access the ID card 9. The mode selector 27 displays a screen for selecting either the shared mode or the discrete mode on the operation panel 2, and holds mode information indicating a mode selected by a user or a default mode.

The information processing program can be a software development kit application program (SDK AP). In this case, there can be employed a configuration, in which the SDK AP is stored in the HDD 13 as illustrated in FIG. 13 to be provided to other program developer, e.g., a third party.

PIN-based (secret-number-based) restriction is generally imposed on reading/writing card information from/to an ID card. A typical device (hereinafter, "device of a first typical type") is configured such that, when an ID card, on which PIN-based reading/writing restriction is imposed, is brought into proximity of a card reader, a PIN input screen appears. When a valid PIN is entered by a user to the PIN input screen, the PIN is compared with a PIN read out from the ID card to determine whether or not to permit login. When the login succeeds, permission to access to the card information is granted to standard application programs (the copier AP, the FAX AP, and the like) and the SDK APs (various types of SDK solutions).

Meanwhile, it is desirable to validate a PIN each time an ID card is used to prevent unauthorized use of the ID card, which can occur in an event where the ID is stolen or the like. However, if entering a PIN is required frequently, convenience in using the device can disadvantageously decrease. For this reason, a device of the first typical type is configured as follows. The device receives a PIN input and performs PIN authentication when a login attempt is made to start using the device. After the authentication succeeds, the device of the first typical type omits PIN authentication during a period between login and logout however often the ID card is used. There may be employed a configuration, in which automatic logout occurs when the ID card is used again during the login.

As described above, in a device of the first typical type, processing for application programs including the standard application programs and the SDK application programs, and PIN authentication processing are executed independently. The device of the first typical type increases convenience in using the device by, after authentication of a PIN of a user at login succeeds, making it possible to omit entering the PIN until the user logs out.

Another typical device (hereinafter, "device of a second typical type") operates as follows. When a login attempt made by entering a valid PIN of an ID card succeeds, the device stores identification information of the ID card and the PIN associated with each other. The device of the second typical type reuses the PIN associated with the identification information of the ID card when entering the PIN is required during the login. The device increases convenience in PIN authentication using the ID card in this manner.

However, it is generally difficult to authenticate a PIN at an occasion other than login. Furthermore, it is difficult for a non-authentication-type AP that does not have a PIN authentication function to perform PIN authentication. For these reasons, it is difficult with a device of the first typical type to securely share a result of PIN authentication between an application program (authentication-type AP) having a PIN authentication function and a non-authentication-type AP.

Assume a situation where, for example, a user logs in to a device of the first typical type using an ID card, searches for a commodity in a browser on the device, and makes payment by electronic funds transfer. In this situation, PIN authentication should not necessarily be performed at login. For such a situation, it is preferable that a system designer configures the device such that PIN authentication can be performed at desired timing according to a specific screen flow.

However, it is difficult to perform PIN authentication at an occasion other than login with a device of the first typical type. Accordingly, it is difficult with a device of the first typical type to perform PIN authentication at desired timing according to a specific screen flow.

A device of the second typical type can increase convenience in PIN authentication using an ID card by reusing a PIN associated with identification information of the ID card when re-entering the PIN is required during the login. However, it is difficult with a device of the second typical type to perform PIN authenticate at an occasion other than login. Accordingly, it is difficult with a device of the second typical type to securely share a result of PIN authentication between an application program (authentication-type AP) having a PIN authentication function and a non-authentication-type AP.

In contrast to such devices of these typical types, the device of the first embodiment has the two modes: the shared mode that places higher importance on usability; and the discrete mode that places higher importance on security. A user can switch between the modes as desired. Accordingly, the device of the first embodiment can satisfy both a demand to place higher importance on usability and a demand to place higher importance on security.

More specifically, to use an ID card, on which PIN-based reading/writing restriction is imposed, it is typically necessary to unlock a PIN by entering a valid PIN to a PIN input screen. However, not all non-authenticated application programs have a PIN input screen. Accordingly, it will be difficult to provide an ID-card-based solution solely by a non-authentication-type AP.

In view of the circumstances, the device of the first embodiment has the shared mode. In this mode, after a user is authenticated as an authorized user by an authentication-type AP, card information can be shared among the authentication-type AP, the other authentication-type AP(s), and the non-authentication-type APs. The device of the first embodiment thus eliminates the need of performing PIN authentication each time switching from one application program to another occurs. The device of the first embodiment also has the discrete mode, in which PIN authentication is performed each time. Accordingly, when a user desires to place higher priority on security, the user can select the discrete mode. This configuration allows preventing an undesirable situation that card information of the ID card 9 is used by an application program of unknown security level.

Figure 3:
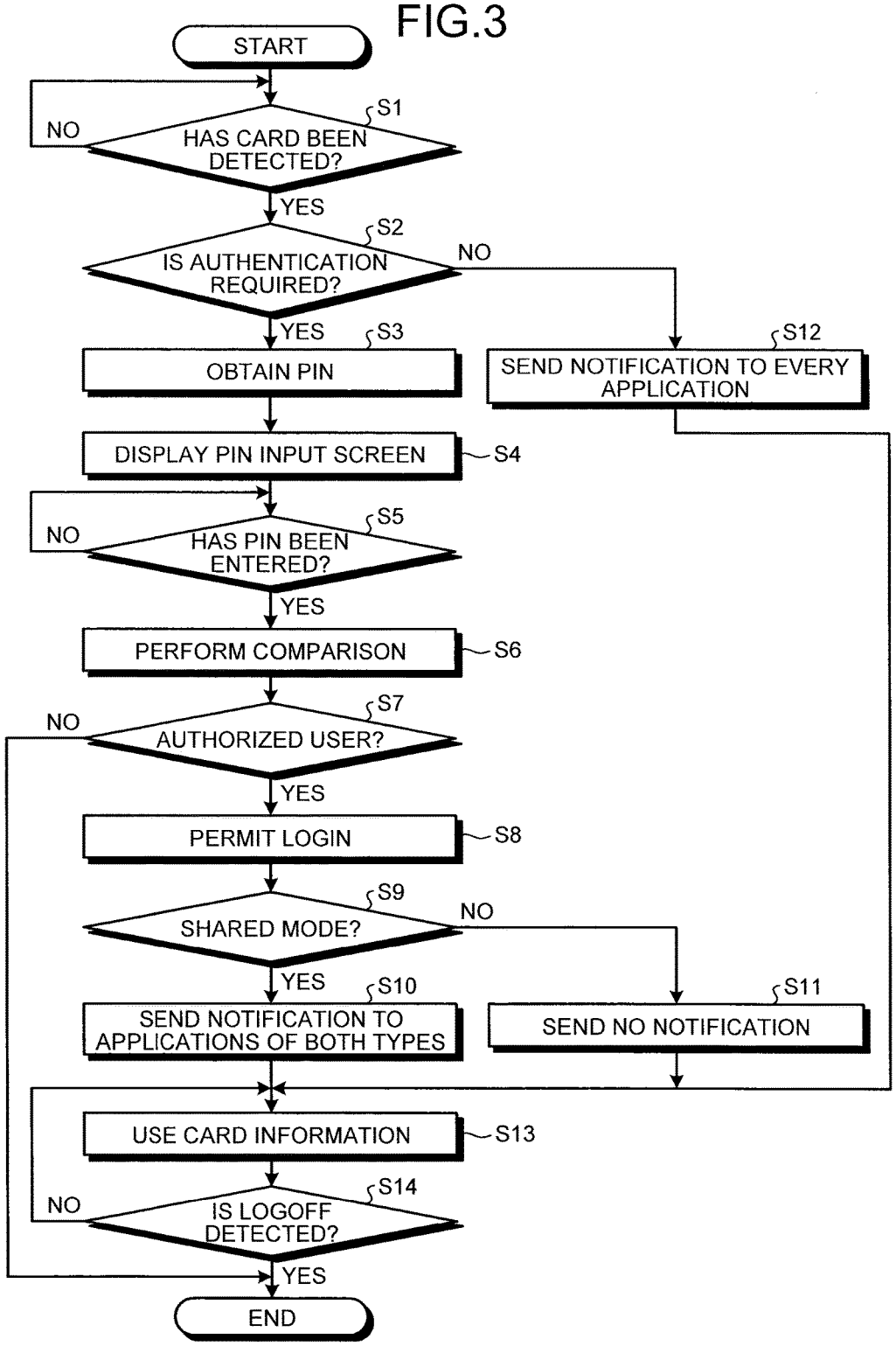
FIG. 3 is a flowchart for describing a card-information sharing operation of the device according to the first embodiment.

FIG. 3 is a flowchart illustrating an operation, in which the CPU 14 of the device according to the first embodiment enters either the shared mode or the discrete mode. When main power supply to the device of the first embodiment is switched on, the CPU 14 loads and starts up the OS. The CPU 14 also loads the information processing program stored in the HDD 13, thereby loading the R/L control unit 21, the PIN obtaining unit 22, the secret-number obtaining unit 23, the identifying unit 24, the authenticating unit 25, the sharing control unit 26, and the mode selector 27 (hereinafter, "the R/L control unit 21 through the mode selector 27") into the RAM 11. The CPU 14 executes the operation of the flowchart illustrated in FIG. 3 from Step S1 while functioning as the R/L control unit 21 through the mode selector 27.

In Step S1, the R/L control unit 21 determines whether or not the R/L 8 has detected the ID card 9 by monitoring a communication status of the R/L 8. More specifically, a user attempting to log in to the device of the first embodiment brings the ID card 9 into proximity of the R/L 8. Upon detecting that the ID card 9 is in proximity of the R/L 8, the R/L 8 transmits a predetermined carrier signal to the ID card 9 and supplies electric power to the ID card 9 by electromagnetic induction. The R/L 8 carries out wireless/contactless communication with the ID card 9 by modulating the carrier signal. When the R/L control unit 21 detects that the R/L 8 and the ID card 9 have started wireless/contactless communication (Yes in Step S1), the operation proceeds to Step S2.

In Step S2, the identifying unit 24 identifies whether the ID card 9 is an ID card that requires user authentication or an ID card that does not require user authentication via the R/L 8. If the ID card 9 is an ID card that requires user authentication (Yes in Step S2), the operation proceeds to Step S3. If the ID card 9 is an ID card that does not require user authentication (No in Step S2), the operation proceeds to Step S12.

In Step S12, the sharing control unit 26 notifies every application program that permission to use card information of the ID card 9 is granted to the application program because the ID card 9 is an ID card that does not require user authentication. For example, although it is merely an example, assume that the device of the first embodiment has a flag recording area in any one of the HDD 13, the RAM 11, and the ROM 12. A flag indicating whether permission to use the card information of the ID card 9 is granted is written to the flag recording area. The flag recording area is provided on a per-application-program basis. In other words, each of the application programs has its own flag recording area. The sharing control unit 26 flags (i.e., writes "1" to) the flag recording area of each application program, to which permission to use the card information of the ID card 9 is granted. The sharing control unit 26 unflags (i.e., writes "0" to) the flag recording area of each application program, on which restriction to use the card information of the ID card 9 is imposed. In Step S12, the sharing control unit 26 flags the flag recording area of every application program. Each of the application programs detects the flag in its own flag recording area before starting processing. Accordingly, each application program can recognize that the application program is permitted to use the card information of the ID card 9.

An application program that has recognized that the application program can use the card information accesses the ID card 9 via the R/L 8 and executes processing by reading/writing the card information in Step S13. Such use of the card information by the application program is performed until the CPU 14 detects logoff in Step S14. For one example, the CPU 14 of the device of the first embodiment may cause the user to log off of the device when the CPU 14 detects that the ID card 9 is brought into proximity of the R/L 8 and wireless/contactless communication is started in a state where the R/L 8 is making no access to the ID card 9. The CPU 14 may cause the user to log off also when the CPU 14 detects a logoff action made by the user via the operation panel 2. Furthermore, when it is measured that a predetermined period of time has elapsed since the device enters a no-operation state, the CPU 14 automatically may cause the user to log off of the device. The card information is used by the application program in Step S13 until the CPU 14 causes the user to log off in Step S14 as described above.

Figure 4:
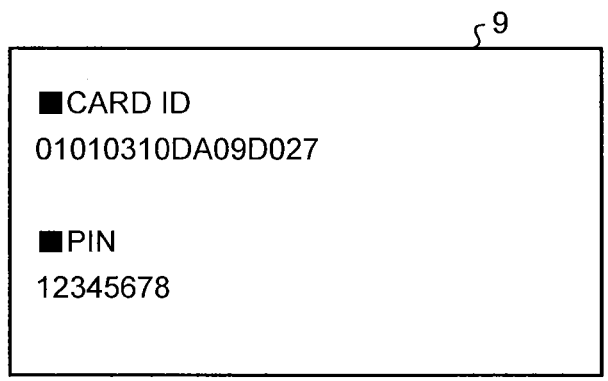
FIG. 4 is a diagram illustrating an example of card information stored in an ID card used by the device according to the first embodiment.

If the ID card 9 is discriminated as an ID card that requires user authentication (Yes in Step S2) and the operation proceeds to Step S3, the PIN obtaining unit 22 obtains a PIN. In the device of the first embodiment, the PIN is stored in the ID card 9, for example. FIG. 4 is a diagram illustrating an example of the card ID and the PIN stored in the ID card 9. Referring to the example of the ID card 9 illustrated in FIG. 4, a card ID "01010310DA09D027" and a PIN "12345678" are stored in the ID card 9. The PIN obtaining unit 22 accesses the ID card 9 via the R/L 8 in Step S3. The PIN obtaining unit 22 obtains the PIN stored in the ID card 9 and temporarily stores the PIN in the RAM 11, for example.

Alternatively, the PIN may be stored in any one of the HDD 13, the RAM 11, and the ROM 12. In this case, PINs and card IDs of the ID cards 9 are stored as being respectively associated with each other in the HDD 13 or the like. The PIN obtaining unit 22 accesses the ID card 9 via the R/L 8 and obtains a card ID stored in the ID card 9 in Step S3. The PIN obtaining unit 22 searches the HDD 13 or the like for the same card ID as the card ID obtained from the ID card 9. The PIN obtaining unit 22 retrieves a PIN stored as being associated with the same card ID in the HDD 13 or the like. The PIN obtaining unit 22 temporarily stores the PIN retrieved from the HDD 13 or the like in the RAM 11, for example.

Subsequently, after the PIN is obtained in Step S3, the operation proceeds to Step S4, where the secret-number obtaining unit 23 displays a secret-number input screen on the operation panel 2. More specifically, each authentication-type AP, which performs user authentication, of the application programs stored in the HDD 13 has a program for displaying a secret-number input screen. Accordingly, the secret-number obtaining unit 23 displays the secret-number input screen by reading out and executing the program for displaying the secret-number input screen from any one of the authentication-type APs stored in the HDD 13.

The user enters a secret number (PIN) to the displayed secret-number input screen by touch operation on the operation panel 2. In Step S5, the secret-number obtaining unit 23 determines whether a secret number has been entered by the user via the operation panel 2. If the secret-number obtaining unit 23 detects that a secret number has been entered (Yes in Step S5), the operation proceeds to Step S6.

In Step S6, the authenticating unit 25 compares the PIN obtained from the ID card 9 or the HDD 13 or the like, with the secret number (PIN) entered by the user via the operation panel 2. If the PIN and the secret number match as a result of this comparison, the authenticating unit 25 authenticates the user as an authorized user. If the user is authenticated as an authorized user by the authenticating unit 25, the operation proceeds to Step S7 and then to Step S8. However, if the user is not authenticated as an authorized user (i.e., the user is an unauthorized user) by the authenticating unit 25, the CPU 14 terminates the operation illustrated in the flowchart of FIG. 3. The procedure described above causes an operation performed on the device by a not-yet-authenticated user to be rejected.

If the user is authenticated as an authorized user and the operation proceeds to Step S8, the CPU 14 permits the authenticated authorized user to log in to the device. The operation then proceeds to Step S9.

Figure 5:
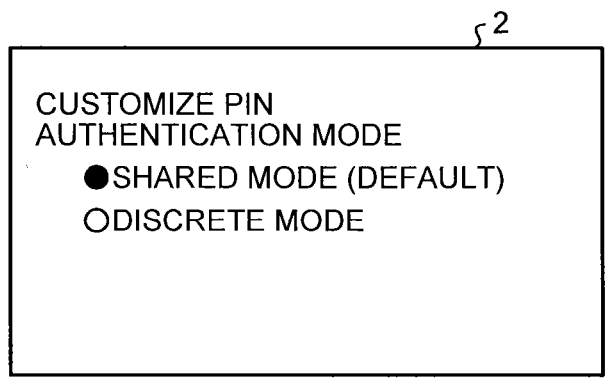
FIG. 5 is a diagram illustrating an example of a mode selection screen of the device according to the first embodiment.

In Step S9, the sharing control unit 26 determines whether the device is in the shared mode. More specifically, in the device of the first embodiment, either the shared mode or the discrete mode is selected by operating the operation panel 2. FIG. 5 illustrates an example of an authentication-mode customizing screen. "SHARED MODE" and "DISCRETE MODE" are displayed as a text list on the example screen illustrated in FIG. 5. A user performs a touch operation at a position where a desired one of the modes is displayed. During such customization of the authentication mode, the CPU 14 functions as the mode selector 27 and recognizes that the authentication mode displayed at the touched position is selected by the user. The mode selector 27 stores mode information indicating the authentication mode selected by the user in the HDD 13, the RAM 11, or the ROM 12. When functioning as the sharing control unit 26 in Step S9, the CPU 14 accesses the HDD 13 or the like to read the mode information to determine whether the device is in the shared mode.

Meanwhile, a device is generally required to be operationally convenient. For this reason, the shared mode is set as a default mode in the device of the first embodiment. Alternatively, the discrete mode may be set as the default mode.

If the sharing control unit 26 determines that the device is in the shared mode (Yes in Step S9), the operation proceeds to Step S10. If the sharing control unit 26 determines that the device is in the discrete mode (No in Step S9), the operation proceeds to Step S11.

In Step S10, the sharing control unit 26 notifies the authentication-type APs and the non-authentication-type APs stored in the HDD 13 that permission to use card information of the ID card 9 is granted. For one example, the device of the first embodiment may have the flag recording area in any one of the HDD 13, the RAM 11, and the ROM 12 as described above. A flag indicating whether permission to use the card information of the ID card 9 is granted is stored in the flag recording area. The flag recording area is provided on the per-application-program basis. In Step S10, the sharing control unit 10 sets a flag in the flag recording area of each of the authentication-type APs and the non-authentication-type APs. Each of the application programs detects the flag in its own flag recording area before starting processing. Accordingly, each application program can recognize that the application program is permitted to use the card information of the ID card 9.

An application program that has recognized that the application program can use the card information accesses the ID card 9 via the R/L 8 and executes processing by reading/writing the card information in Step S13. In the shared mode, permission to access the ID card 9 is granted to both of the authentication-type APs and the non-authentication-type APs. The user has been authenticated at login. Accordingly, information stored in the ID card 9 can be shared between the authentication-type APs and the non-authentication-type APs while ensuring security. Such use of the card information by the application program is performed until the CPU 14 detects logoff in Step S14.

On the other hand, if it is determined that the device is in the discrete mode (No in Step S9) and the operation proceeds to Step S11, the sharing control unit 26 unflags the flag recording area of every non-authentication-type AP. In other words, in Step S11, the sharing control unit 26 imposes restriction of use of the card information on all the non-authentication-type APs. If the device is in the discrete mode, use of the card information is restricted even when the user is authenticated as an authorized user in this manner.

In Step S11, the sharing control unit 10 flags the flag recording area of only each of one or more authentication-type APs designated by the user to start up. The sharing control unit 26 also unflags the flag recording areas of all the authentication-type APs other than the one or more authentication-type APs designated by the user to start up. An authentication-type AP that has recognized that the authentication-type AP can use the card information accesses the ID card 9 via the R/L 8 and executes processing by reading/writing the card information in Step S13. The operation described above causes only the one or more authentication-type APs designated by the user to start up to execute processing while using the card information of the ID card 9.

Such use of the card information by the one or more authentication-type APs designated by the user to start up is performed until the CPU 14 detects logoff in Step S14. In this discrete mode, permission to use the card information is not granted to the non-authentication-type APs that do not perform user authentication. Furthermore, in this mode, authorized-user authentication is performed individually for each of the one or more authentication-type APs designated by the user to start up. Permission to use the card information is granted only when the user is authenticated as an authorized user. As a result, it becomes possible to grant permission to use the card information only to the security-ensured authentication-type AP(s). Such use the card information by the one or more authentication-type APs designated by the user to start up is performed until the CPU 14 detects logoff in Step S14 (Yes in Step S14).

As will be apparent from the above description, the device of the first embodiment is advantageous in the following respects. When the device is in the shared mode and a user is authenticated as an authorized user, a notification indicating that the user is an authorized user is sent to the authentication-type APs and the non-authentication-type APs. Accordingly, when a user is authenticated as an authorized user, card information stored in the ID card 9 can be shared between the authentication-type APs and the non-authentication-type APs securely. Furthermore, when a user is authenticated as an authorized user, even a non-authentication-type AP having no authentication function and no identification-number input screen can access the ID card 9 and use the card information stored in the ID card 9. Even when such sharing is permitted, security of the card information stored in the ID card 9 can be ensured because the user has been authenticated as an authorized user. In other words, after a user is authenticated as an authorized user, the device of the first embodiment allows the card information stored in the ID card 9 to be securely shared between the authentication-type APs and the non-authentication-type APs.

Each of the application programs can recognize that the user is an authorized user based on a notification about the authentication result sent to the application program. Accordingly, it is unnecessary for designers of the application programs to design the application programs so as to perform user authentication at login. That is, designers of each application program can set timing when user authentication of the application program be performed as desired. Accordingly, the device of the first embodiment can increase the degree of freedom in application program design.

The device of the first embodiment allows selecting either the shared mode or the discrete mode. When the device is in the shared mode and a user is authenticated as an authorized user, the device permits the card information stored in the ID card 9 to be shared among the application programs. The card information can be shared securely even when an authentication result is shared in such a manner because the user has already been authenticated as an authorized user. Furthermore, notification about the authentication result indicating that the user is an authorized user is sent to each of the application programs. Accordingly, each application program can start processing immediately when a command to execute the application program is issued without repeating user authentication. Consequently, a user performing a job while switching from one application program to another among a plurality of application programs can process the job smoothly by continuously starting up the application programs without being intervened by user authentication.

When the device is in the discrete mode, the device disables the non-authentication-type APs from accessing the card information stored in the ID card 9. When in the discrete mode, the device performs user authentication on a per-authentication-application-program basis. Put another way, when in the discrete mode, the device permits only a single authentication-type AP, for which a user is authenticated as an authorized user, to use the card information of the ID card 9. As a result, security of the card information stored in the ID card 9 can be ensured.

The advantages of the device of the first embodiment can be put in other words as follows. When the device is in the shard mode, the device can permit the card information stored in the ID card 9 to be shared between the authentication-type APs and the non-authentication-type APs while ensuring security. The device can provide both a usage pattern (i.e., the shared mode) that places higher importance on operability (usability) and a usage pattern (i.e., the discrete mode) that places higher importance on security.

Furthermore, if the device is used to construct an information processing system including authentication-type APs and non-authentication-type APs in a mixed manner, the device permits information stored in the ID card 9 to be shared between the application programs while ensuring security.

Second Embodiment

An information processing system according to a second embodiment of the present invention is described below. In the device of the first embodiment, a PIN for use in user authentication is read out from the ID card 9. In the device of the first embodiment, a PIN for use in user authentication may alternatively be read out from the HDD 13. In contrast, in the information processing system according to the second embodiment, a PIN is obtained from a server on a network. In the description of the information processing system of the second embodiment, each element/operation indicating a same operation as that of the first information processing system is denoted by like reference numeral or a step number in the drawings, and detailed description is omitted.

Figure 6:
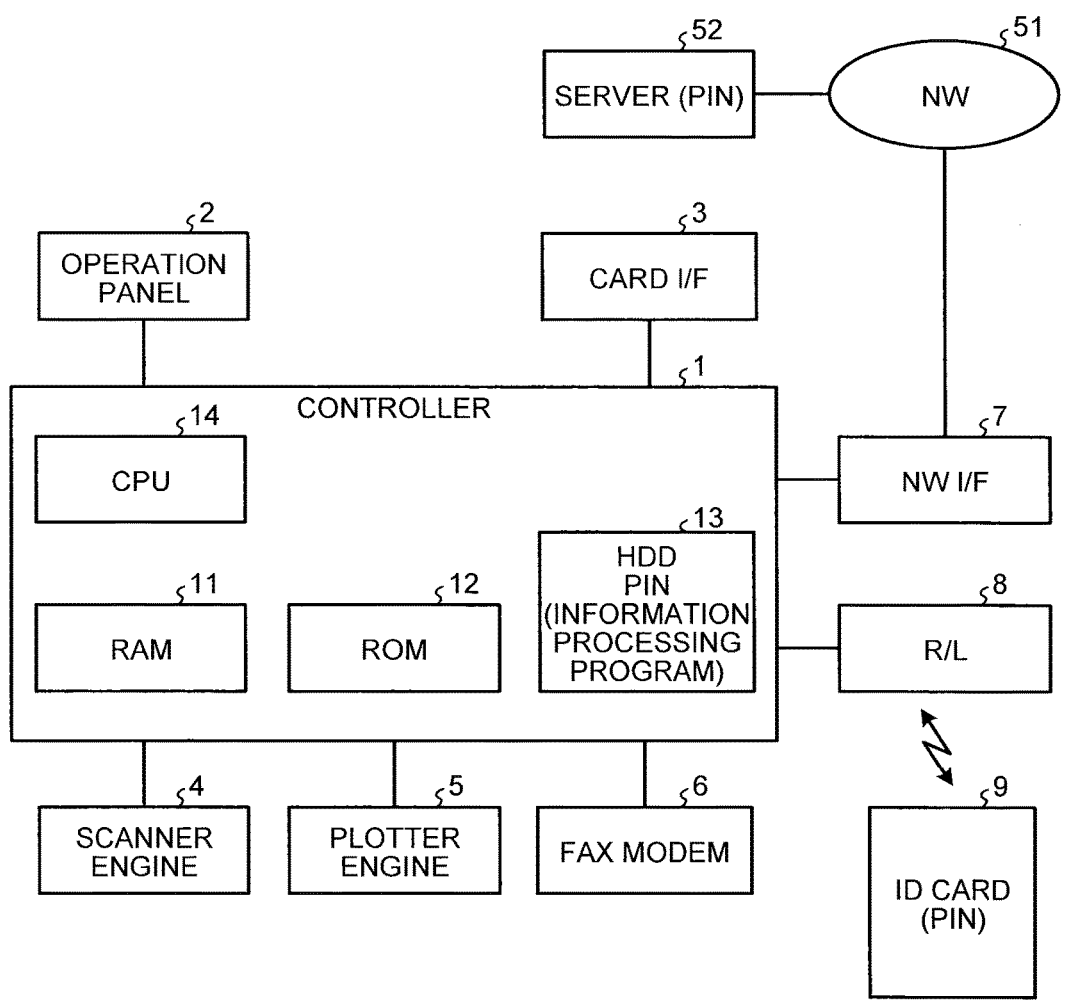
FIG. 6 is a hardware configuration diagram of an information processing system according to a second embodiment.

FIG. 6 is a hardware configuration diagram of the information processing system according to the second embodiment. As illustrated in FIG. 6, the information processing system according to the second embodiment includes the device of the first embodiment and a server 52 connected to a network (NW) 51. The server 52 is connected to the device via the network 51 and the network interface (NW I/F) 7.

Figure 7:
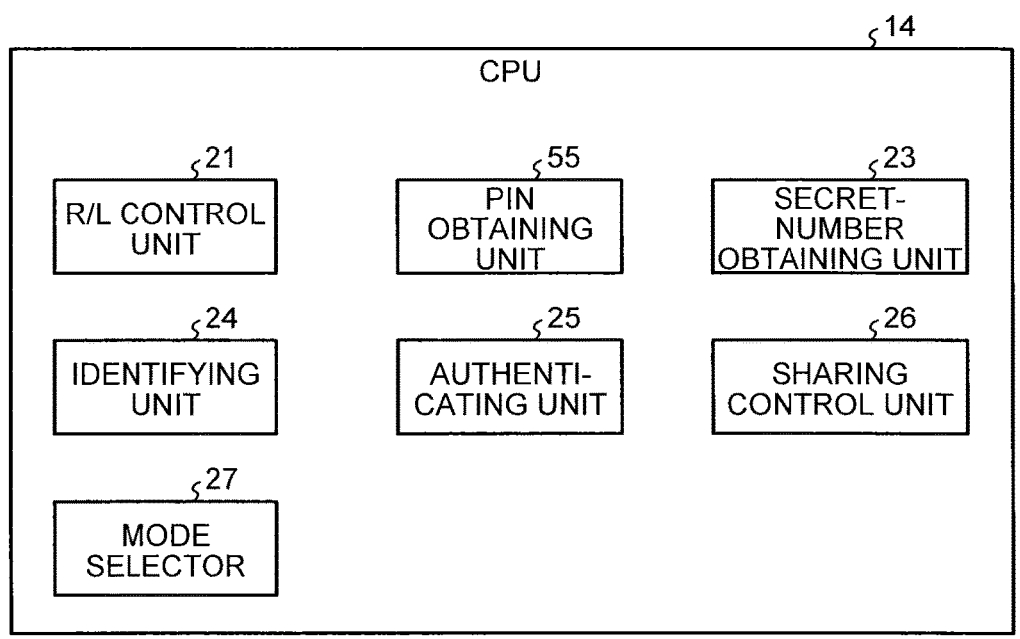
FIG. 7 is a functional block diagram of a controller of a device of the information processing system according to the second embodiment.

FIG. 7 is a functional block diagram of the CPU 14 of the device of the information processing system according to the second embodiment. A PIN obtaining unit 55 of the CPU 14 performs a characteristic function of the information processing system according to the second embodiment. More specifically, in contrast to the PIN obtaining unit 22 illustrated in FIG. 2 that obtains a PIN from the ID card 9 or the HDD 13, the PIN obtaining unit 55 obtains a PIN from the server 52 on the network 51, which will be described later.

Figure 8:
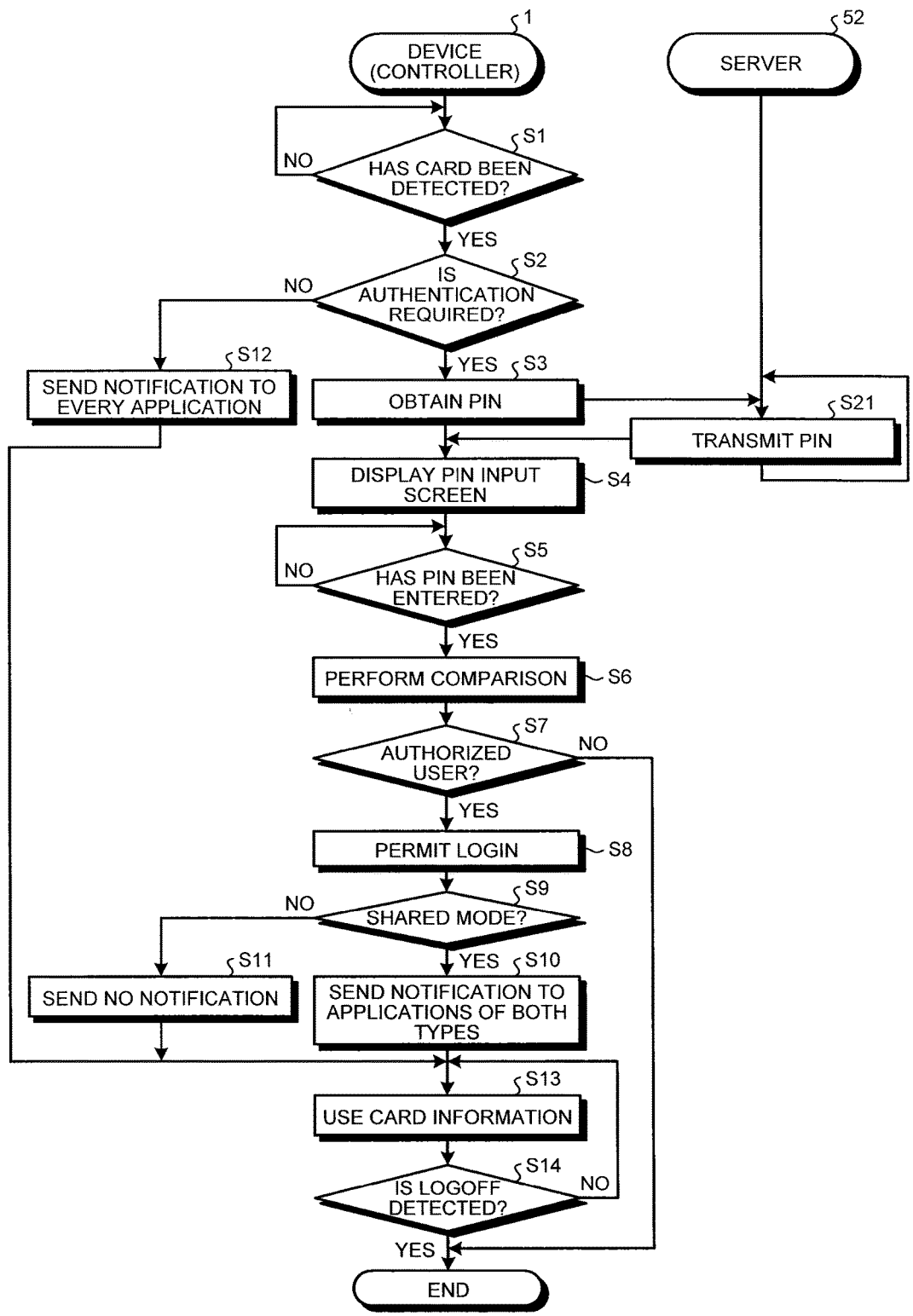
FIG. 8 is a time chart for describing a card-information sharing operation in the information processing system according to the second embodiment.

FIG. 8 is a time chart illustrating an operation, in which the device of the information processing system according to the second embodiment obtains a PIN from the server 52, performs user authentication, and enters either the shared mode or the discrete mode. Referring to FIG. 8, when main power supply to the device is switched on, the CPU 14 of the controller 1 of the device loads and starts up the OS program. The CPU 14 also loads information processing program stored in the HDD 13, thereby loading the secret-number obtaining unit 23, the identifying unit 24, the authenticating unit 25, the sharing control unit 26, the mode selector 27 (hereinafter, "the secret-number obtaining unit 23 through the mode selector 27"), the R/L control unit 21, and the PIN obtaining unit 55 into the RAM 11. The CPU 14 executes the operation of the time chart illustrated in FIG. 8 from Step S1 while functioning as the R/L control unit 21, the secret-number obtaining unit 23 through the mode selector 27, and the PIN obtaining unit 55.

In Step S1, the R/L control unit 21 determines whether or not the R/L 8 has detected the ID card 9 by monitoring a communication status of the R/L 8. When the R/L control unit 21 detects that the R/L 8 and the ID card 9 have started wireless/contactless communication, the operation proceeds to Step S2. In Step S2, the identifying unit 24 identifies whether the ID card 9 is an ID card that requires user authentication or an ID card that does not require user authentication via the R/L 8. If the ID card 9 is an ID card that requires user authentication, the operation proceeds to Step S3.

The PIN obtaining unit 55 obtains the card ID described above with reference to FIG. 4 from the ID card 9 via the R/L 8 in Step S3. In Step S3, the PIN obtaining unit 55 also transmits the obtained card ID to the server 52 via the NW I/F 7. In Step S3, the PIN obtaining unit 55 requests the server 52 to transmit a PIN.

The server 52 contains a database (an example of authentication device) (not shown), in which card IDs of the ID cards 9 and PINs related to the ID cards 9 are stored as being respectively associated with each other. The server 52 retrieves, from the database, a PIN associated with the card ID received from the device. In Step S21, the server 52 transmits the retrieved PIN to the device over the network 51. The CPU 14 of the device obtains the PIN transmitted from the server 52 via the NW I/F 7 and temporarily stores the PIN in the RAM, for example.

The PIN obtained from the server 52 in this manner is used in user authentication as in the device of the first embodiment. This is briefly described below. After obtaining the PIN from the server 52, the CPU 14 prompts a user to enter a security number (PIN) in Step S4 and Step S5. When a PIN has been entered by the user, the CPU 14 compares the PIN obtained from the server 52 with the PIN entered by the user in Step S6. If the PINs match, the CPU 14 authenticates the user as an authorized user in Step S7, and permits the user to log in to the device in Step S8.

In Step S9, the CPU 14 detects an authentication mode, either the shared mode or the discrete mode, in which the device is. If the device is in the shared mode, in Step S10, the CPU 14 notifies both the authentication-type APs and the non-authentication-type APs that permission to use card information is granted. If the device is in the discrete mode, the CPU 14 imposes restriction of use of the card information on the non-authentication-type APs. Furthermore, if the device is in the discrete mode, authorized-user authentication is performed individually for each of one or more authentication-type APs designated by the user to start up, and permission to use the card information is granted only when the user is authenticated as an authorized user.

As will be apparent from the above description, the device of the second embodiment performs user authentication by obtaining a PIN from the server 52 at a location physically away from the device. Accordingly, the user authentication can be performed using the PIN that is securely managed in the server 52. As a result, in addition to advantages similar to those provided by the device of the first embodiment, an increase in security level of the information processing system can be obtained.

Third Embodiment

An information processing system according to a third embodiment of the present invention is described below. In the first and second embodiments, user authentication is performed using a PIN. In contrast, in the third embodiment, user authentication is performed using a user ID individually assigned to each user and a card ID rather than using a PIN. The third embodiment differs from the first and second embodiments only in this respect. Accordingly, only this difference is described below, and repeated description is omitted.

Figure 9:
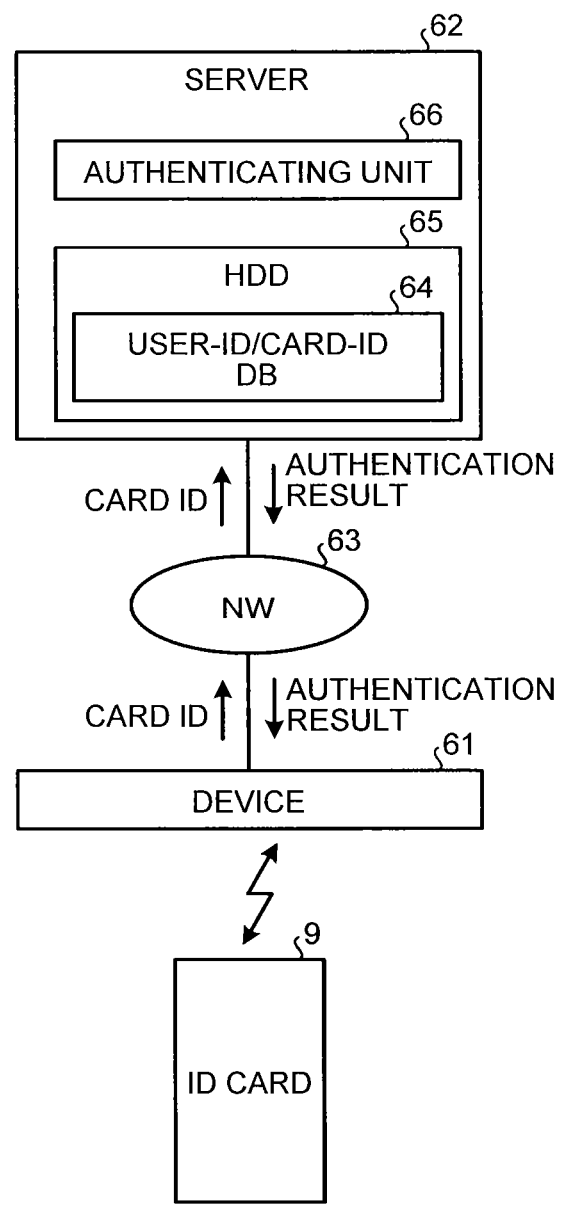
FIG. 9 is a system configuration diagram of an information processing system according to a third embodiment.

FIG. 9 is a configuration diagram of the information processing system according to the third embodiment. As illustrated in FIG. 9, the information processing system according to the third embodiment includes a device 61 that performs similarly to the device of the first embodiment and a server 62 connected to the device 61 via a network 63 such as the Internet. Although FIG. 9 illustrates only the single device 61, alternatively, a plurality of the devices 61 may be connected to the server 62 via the network 63.

The server 62 includes a storage unit, such as an HDD 65, that contains a user-ID/card-ID database (user-ID/card-ID DB) 64, in which user IDs of users and card IDs are stored as being associated with each other. The server 62 also includes an authenticating unit 66 that performs user authentication to determine whether a user related to the card ID is an authorized user by searching the user-ID/card-ID DB 64 for the card ID.

The server 62 can be, for example, an authentication server, an active directory server, or a personnel server that stores employee IDs (corresponding to user IDs) of employees of a company. The authenticating unit 66 may be implemented in either hardware or software.

Figure 10:
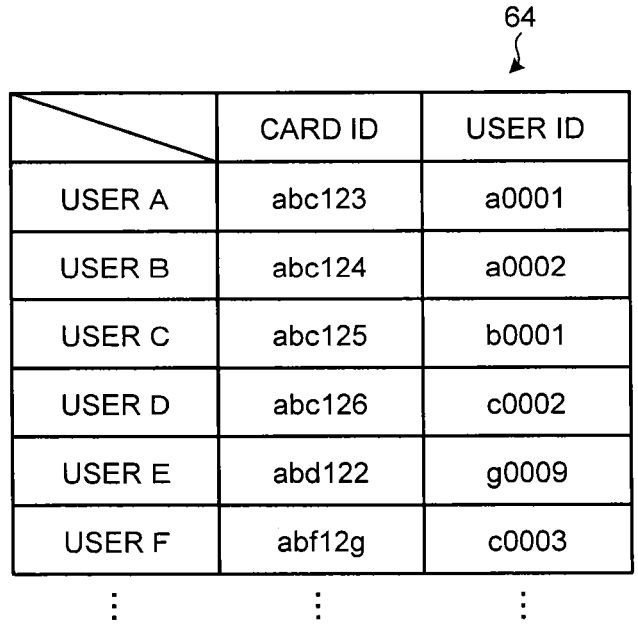
FIG. 10 is a schematic diagram of a user-ID/card-ID database included in the information processing system according to the third embodiment.

FIG. 10 is a schematic diagram of the user-ID/card-ID DB 64. As illustrated in FIG. 10, card IDs and user IDs of users are stored as being respectively associated with each other in the user-ID/card-ID DB 64. More specifically, the card ID "abc123" illustrated in FIG. 10 is a card ID assigned to an ID card owned by a user A. The user ID "a0001" is a user ID assigned individually and uniquely to the user A. Similarly, the card ID "abc126" illustrated in FIG. 10 is a card ID assigned to an ID card owned by a user D. The user ID "c0002" is a user ID assigned individually and uniquely to the user D.

The device 61 of the information processing system according to the third embodiment reads the card ID of the ID card 9 using the R/L 8 and transmits the card ID to the server 62 via the network 63 as described above under the first embodiment.

Every authorized user has a user ID that is stored in the user-ID/card-ID DB 64 as being associated with a corresponding card ID. Accordingly, the authenticating unit 66 of the server 62 determines whether a user ID associated with the received card ID is contained in the user-ID/card-ID DB 64 by searching the user-ID/card-ID DB 64 for the card ID transmitted from the device 61. When the authenticating unit 66 determines that a user ID associated with the received card ID is contained in the user-ID/card-ID DB 64, the authenticating unit 66 returns an authentication result indicating that the user is an authorized user to the device 61. When the authenticating unit 66 determines that a user ID associated with the received card ID is not contained in the user-ID/card-ID DB 64, the authenticating unit 66 returns an authentication result indicating that the user is not an authorized user to the device 61.

Upon receiving the authentication result, the device 61 determines whether the user is an authorized user based on the received authentication result as described above under Step S7 of the flowchart of FIG. 3. The device 61 permits the user to log in to the device 61 and executes processing in Steps S10 through S14 as described above only when the user is an authorized user.

As will be apparent from the above description, in the information processing system of the third embodiment, the server 62 on the network 63 performs user authentication using a card ID. The information processing system according to the third embodiments can also provide advantages similar to those of the first and second embodiments.

Fourth Embodiment

An information processing system according to a fourth embodiment of the present invention is described below. The third embodiment described above corresponds to an example, in which the server 62 includes the user-ID/card-ID DB 64. In contrast, the information processing system according to the fourth embodiment corresponds to an example, in which the device includes the user-ID/card-ID DB 64. The fourth embodiment differs from the third embodiment only in this respect. Accordingly, only this difference is described below, and repeated description is omitted.

Figure 11:
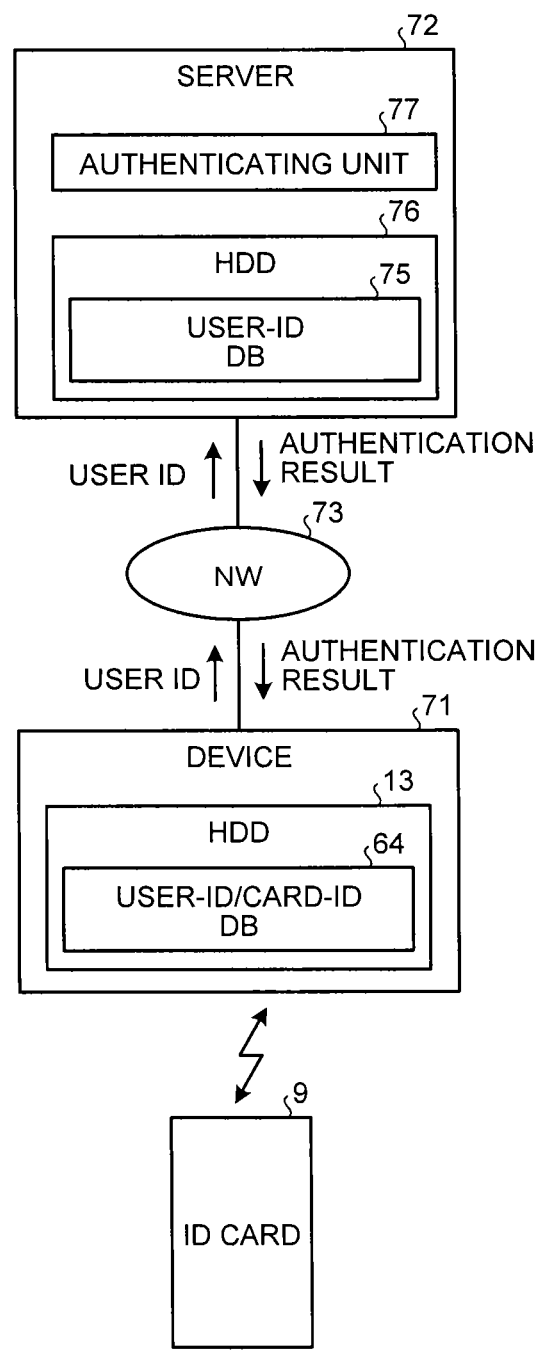
FIG. 11 is a system configuration diagram of an information processing system according to a fourth embodiment.

FIG. 11 is a configuration diagram of the information processing system according to the fourth embodiment. As illustrated in FIG. 11, the information processing system according to the fourth embodiment includes a device 71 that performs similarly to the device of the first embodiment and a server 72 connected to the device 71 via a network 73 such as the Internet. Although FIG. 11 illustrates only the single device 71, alternatively, a plurality of the devices 71 may be connected to the server 72 via the network 73.

The device 71 includes the HDD 13 that contains the user-ID/card-ID DB 64, in which card IDs and user IDs of users are stored as being respectively associated with each other as described above with reference to FIG. 10.

The server 72 includes a storage unit, such as an HDD 76, that contains a user-ID database (user-ID DB) 75, in which the user IDs of the users are stored. The server 72 also includes an authenticating unit 77 that performs user authentication to determine whether a user associated with a user ID is an authorized user by searching the user-ID DB 75 for the user ID.

The server 72 can be, for example, an authentication server, an active directory server, or a personnel server that stores employee IDs (corresponding to user IDs) of employees of a company. The authenticating unit 77 may be implemented in either hardware or software.

The device 71 of the information processing system according to the fourth embodiment reads out the card ID of the ID card 9 using the R/L 8 as described above under the first embodiment. The CPU 14 then searches the user-ID/card-ID DB 64 for the read-out card ID. The CPU 14 retrieves a user ID associated with the read-out card ID and transmits the user ID to the server 72 over the network 73.

Every authorized user has a user ID that is stored in the user-ID DB 75. Accordingly, the authenticating unit 77 of the server 72 determines whether the same user ID as the received user ID is contained in the user-ID DB 75 by searching the user-ID DB 75 for the user ID transmitted from the device 71. When the authenticating unit 77 determines that the same user ID as the received user ID is contained in the user-ID DB 75, the authenticating unit 77 returns an authentication result indicating that the user is an authorized user to the device 71. When the authenticating unit 77 determines that the same user ID as the received user ID is not contained in the user-ID DB 75, the authenticating unit 77 returns an authentication result indicating that the user is not an authorized user to the device 71.

Upon receiving the authentication result, the device 71 determines whether the user is an authorized user based on the received authentication result as described above under Step S7 of the flowchart of FIG. 3. The device 71 permits the user to log in to the device 71 and executes processing in Steps S10 through S14 as described above only when the user is an authorized user.

As will be apparent from the above description, in the information processing system of the fourth embodiment, the device 71 detects a user ID associated with a card ID. The server 72 on the network 73 performs user authentication using the detected user ID. For example, in a situation where the server 72 is a personnel server of a company, user IDs of users (employee IDs of employees) have already been stored in an existing database. The information processing system of the fourth embodiment can be implemented only by making inquiries about user IDs using this database. Accordingly, the information processing system of the fourth embodiment can be implemented without involving modification of a system or the like (or with minimum system modification). Furthermore, advantages similar to those provided by the first to third embodiments can be obtained.

Fifth Embodiment

An information processing system according to a fifth embodiment of the present invention is described below. The third embodiment corresponds to an example, in which the server 62 detects whether or not there is relationship between a card ID and a user ID (performs conversion from the card ID to the user ID) and performs user authentication. In contrast, the information processing system according to the fifth embodiment corresponds to an example, in which the information processing system includes a server that converts a card ID to a user ID and a server that performs user authentication using the converted user ID separately. The fifth embodiment differs from the first through fourth embodiments only in this respect. Accordingly, only this difference is described below, and repeated description is omitted.

FIG. 12 is a configuration diagram of the information processing system according to the fifth embodiment. As illustrated in FIG. 12, the information processing system according to the fifth embodiment includes a device 81 that performs similarly to the device of the first embodiment, a first server 82, and a second server 83 connected to one another via a network 84 such as the Internet. Although FIG. 11 illustrates only the single device 81, alternatively, a plurality of the devices 81 may be connected to the servers 82 and 83 via the network 84.

The first server 82 includes a storage unit, such as an HDD 86, that contains a user-ID/card-ID DB 85, in which card IDs and user IDs of users are stored as being respectively associated with each other. The first server 82 also includes a converting unit 87 that retrieves a user ID associated with a card ID from the user-ID/card-ID DB 85 and transmits the user ID to the second server 83.

The second server 83 includes a storage unit, such as an HDD 89, that contains a user-ID database (user-ID DB) 88, in which the user IDs of the users are stored. The server 83 also includes an authenticating unit 90 that performs user authentication to determine whether a user associated with a user ID is an authorized user by searching the user-ID DB 88 for the user ID.

The first server 82 can be, for example, a management server or an active directory server. The second server 83 can be, for example, an authentication server, an active directory server, or a personnel server that stores employee IDs (user IDs) of employees of a company. The converting unit 87 and the authenticating unit 90 may be implemented in either hardware or software.

The device 81 of the information processing system according to the fifth embodiment reads out the card ID of the ID card 9 using the R/L 8 as described above under the first embodiment. The CPU 14 then transmits the read-out card ID to the first server 82 via the network 84.

The converting unit 87 of the first server 82 retrieves a user ID stored as being associated with the received card ID from the user-ID/card-ID DB 85. The converting unit 87 transmits the retrieved user ID to the second server 83.

Every authorized user has a user ID that is stored in the user-ID DB 88. Accordingly, the authenticating unit 90 of the second server 83 determines whether the user-ID DB 88 contains the same user ID as the user ID received from the first server 82. When the authenticating unit 90 determines that the user-ID DB 88 contains the same user ID as the user ID received from the first server 82, the authenticating unit 90 returns an authentication result indicating that the user is an authorized user to the device 81. When the authenticating unit 90 determines that the user-ID DB 88 does not contain the same user ID as the received user ID, the authenticating unit 90 returns an authentication result indicating that the user is not an authorized user to the device 81.

Upon receiving the authentication result, the device 81 determines whether the user is an authorized user based on the received authentication result as described above under Step S7 of the flowchart of FIG. 3. The device 81 permits the user to log in to the device 81 and executes processing in Steps S10 through S14 as described above only when the user is an authorized user.

As will be apparent from the above description, the information processing system according to the fifth embodiment includes the first server 82 that converts a card ID to a user ID and the second server 83 that performs user authentication using the converted user ID separately. For example, in a situation where the server 83 is a personnel server of a company, user IDs of users (employee IDs of employees) have already been stored in an existing database. Accordingly, it is possible to employ the information processing system of the fourth embodiment only by providing the first server 82 between the personnel server and the device 81 without involving system modification or the like (or with minimum system modification). Furthermore, advantages similar to those provided by the first to fourth embodiments can be obtained.

According to the embodiments, information stored in an authentication device can be shared securely.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device comprising:
a discriminating unit, implemented by circuitry, configured to determine whether an authentication device requires user authentication, in response to detection of the authentication device;
a first obtaining unit, implemented by the circuitry, configured to obtain first identification information for use in user authentication from the authentication device that is determined to require the user authentication by the discriminating unit;
a second obtaining unit, implemented by the circuitry, configured to obtain second identification information entered by a user;
an authenticating unit, implemented by the circuitry, configured to perform authentication to determine whether the user is an authorized user by comparing the first identification information with the second identification information;
a sharing unit, implemented by the circuitry, configured to permit both an authentication-type application program that performs user authentication and a non-authentication-type application program that does not perform user authentication to access the authentication device when an authentication result obtained by the authenticating unit indicates that the user is an authorized user; and a discrete unit, implemented by the circuitry, configured to permit each application program to access the authentication device when an authentication result obtained by the authenticating unit indicates that the user is an authorized user for the each application program, wherein the authenticating unit is configured to determine which of the sharing unit or the discrete unit is selected, the authenticating unit is configured to, prior to performing the user authentication, notify both the authentication-type application program, which performs user authentication, and the non-authentication-type application program, which does not perform user authentication, that permission to access the authentication device has been granted, when the discriminating unit determines that the authentication device does not require the user authentication, the authenticating unit is configured to notify the corresponding application program of the authentication result to access the authentication device when the discrete unit is selected, the authenticating unit is configured to, when the discrete unit is selected, flag each of one or more authentication-type application programs designated to start up, unflag all other authentication-type application programs that have not been designated to start up, allow the flagged each of one or more authentication-type application programs designated to start up to access the authentication device, and disallow the unflagged other authentication-type application programs that have not been designated to start up from accessing the authentication device even if the authentication result obtained by the authenticating unit indicates that the user is an authorized user, and the authenticating unit is configured to, after performing the user authentication, notify both the authentication-type application program, which performs user authentication, and the non-authentication-type application program, which does not perform user authentication, that permission to access the authentication device has been granted, when the sharing unit is selected.

2. The device according to claim 1, further comprising an identifying unit, implemented by the circuitry, configured to obtain an identification result indicating whether or not the authentication device requires access by an authorized user, wherein the sharing unit is configured to permit both the authentication-type application program and the non-authentication-type application program to access the authentication device either when the identification result indicates that the authentication device requires access by the authorized user and an authentication result obtained by the authenticating unit indicates that the user is an authorized user or when the identification result indicates that the authentication device does not require access by the authorized user.

3. The device according to claim 1, wherein the authentication device is any one of a storage medium card, a storage device provided in the device, and a storage device provided in a server on a predetermined network.

4. The device according to claim 1, wherein the first obtaining unit is configured to obtain the first identification information by carrying out wireless/contactless communication with the authentication device brought into proximity of the device.

5. The device according to claim 1, wherein the authorized user is a user authenticated by the authenticating unit by detecting a match between the first identification information and the second identification information.

6. An information processing system, comprising:

a discriminating unit, implemented by circuitry, configured to determine whether an authentication device requires user authentication, in response to detection of the authentication device;

an authenticating unit, implemented by the circuitry, configured to perform authentication to determine whether a user is an authorized user by using information stored in the authentication device that is determined to require the user authentication by the discriminating unit;

a sharing unit, implemented by the circuitry, configured to permit both an authentication-type application program that performs user authentication and a non-authentication-type application program that does not perform user authentication to access the authentication device when an authentication result obtained by the authenticating unit indicates that the user is an authorized user; and a discrete unit, implemented by the circuitry, configured to permit each application program to access the authentication device when an authentication result obtained by the authenticating unit indicates that the user is an authorized user for the each application program, wherein the authenticating unit is configured to determine which of the sharing unit or the discrete unit is selected, the authenticating unit is configured to, prior to performing the user authentication, notify both the authentication-type application program, which performs user authentication, and the non-authentication-type application program, which does not perform user authentication, that permission to access the authentication device has been granted, when the discriminating unit determines that the authentication device does not require the user authentication, the authenticating unit is configured to notify the corresponding application program of the authentication result to access the authentication device when the discrete unit is selected, the authenticating unit is configured to, when the discrete unit is selected, flag each of one or more authentication-type application programs designated to start up, unflag all other authentication-type application programs that have not been designated to start up, allow the flagged each of one or more authentication-type application programs designated to start up to access the authentication device, and disallow the unflagged other authentication-type application programs that have not been designated to start up from accessing the authentication device even if the authentication result obtained by the authenticating unit indicates that the user is an authorized user, and the authenticating unit is configured to, after performing the user authentication, notify both the authentication-type application program, which performs user authentication, and the non-authentication-type application program, which does not perform user authentication, that permission to access the authentication device has been granted, when the sharing unit is selected.

7. The information processing system according to claim 6, further comprising:
- a transmitting unit, implemented by the circuitry, configured to transmit first identification information stored in the authentication device;
- a first obtaining unit, implemented by the circuitry, configured to obtain the transmitted first identification information; and
- a second obtaining unit, implemented by the circuitry, configured to obtain second identification information entered by a user, wherein
- the authenticating unit is configured to perform the authentication by comparing the first identification information with the second identification information.

8. The information processing system according to claim 6, further comprising:
- a database storage device configured to store therein user identification information of a user of each authentication device and a device identification number uniquely assigned to the each authentication device so that the user identification information and the device identification number are associated with each other; and
- a device-number transmitting unit, implemented by the circuitry, configured to read out the device identification number from the authentication device and transmit the device identification number, wherein
- the authenticating unit is configured to authenticate the user as an authorized user when the authenticating unit detects that the database storage device contains user identification information associated with the device identification number transmitted from the device-number transmitting unit.

9. The information processing system according to claim 6, further comprising:
- a database storage device configured to store therein a user identification number of a user of each authentication device and a device identification number uniquely assigned to the each authentication device so that the user identification number and the device identification number are associated with each other;
- a device-number obtaining unit, implemented by the circuitry, configured to obtain the device identification number from the authentication device;
- a user-number transmitting unit, implemented by the circuitry, configured to retrieve the user identification number associated with the device identification number obtained by the device-number obtaining unit from the database storage device and transmit the user identification number; and
- a user-information storage device configured to store therein user identification information of the user, wherein
- the authenticating unit is configured to authenticate the user as an authorized user when the authenticating unit detects that the user-information storage device contains the user identification number received from the user-number transmitting unit.

10. The information processing system according to claim 6, further comprising:
- a device-number transmitting unit, implemented by the circuitry, configured to read out the device identification number uniquely assigned to the authentication device from the authentication device and transmit the device identification number;
- a database storage device configured to store therein a user identification number of a user of each authentication device and a device identification number uniquely assigned to the each authentication device so that the user identification number and the device identification number are associated with each other;
- a user-number transmitting unit, implemented by the circuitry, configured to retrieve the user identification number associated with the device identification number received from the device-number transmitting unit from the database storage device and transmit the user identification number; and
- a user-information storage device configured to store therein user identification information of the user, wherein
- the authenticating unit is configured to authenticate the user as an authorized user when the authenticating unit detects that the user-information storage device contains the user identification number received from the user-number transmitting unit.

11. A control method comprising:
- determining, by circuitry, whether an authentication device requires user authentication, in response to detection of the authentication device;
- obtaining, by the circuitry, first identification information for use in user authentication from the authentication device that is determined to require the user authentication by the determining;
- obtaining, by the circuitry, second identification information entered by a user;
- performing, by the circuitry, authentication to determine whether the user is an authorized user by comparing the first identification information with the second identification information;
- permitting, by the circuitry, entry of a shared mode that permits both an authentication-type application program that performs user authentication and a non-authentication-type application program that does not perform user authentication to access the authentication device when an authentication result indicates that the user is an authorized user;
- permitting, by the circuitry, entry of a discrete mode that permits each application program to access the authentication device when an authentication result indicates that the user is an authorized user for the each application program;
- determining which of the sharing mode or the discrete mode is selected;
- notifying, prior to performing the user authentication, both the authentication-type application program, which performs user authentication, and the non-authentication-type application program, which does not perform user authentication, that permission to access the authentication device has been granted, when the determining determines that the authentication device does not require the user authentication;
- notifying the corresponding application program of the authentication result to access the authentication device when the discrete mode is selected;
- when the discrete mode is selected, flagging each of one or more authentication-type application programs designated to start up, unflagging all other authentication-type application programs that have not been designated to start up, allowing the flagged each of one or more authentication-type application programs designated to start up to access the authentication device, and disallowing the unflagged other authentication-type application programs that have not been designated to start up from accessing the authentication device even if the authentication result indicates that the user is an authorized user; and notifying, after performing the user authentication, both the authentication-type application program, which performs user authentication, and the non-authentication-type application program, which does not perform user authentication, that permission to access the authentication device has been granted, when the sharing mode is selected.

* * * * *